3,527,819
OXYCHLORINATION PROCESS FOR PREPARING TRICHLOROETHYLENE AND TETRACHLOROETHYLENE

Sidney Berkowitz, Highland Park, and Morton Meadow, Trenton, N.J., assignors to FMC Corporation, New York, N.Y., a corporation of Delaware
No Drawing. Filed Apr. 3, 1967, Ser. No. 627,855
Int. Cl. C07c 21/10, 21/12; B01j 11/78
U.S. Cl. 260—654
4 Claims

ABSTRACT OF THE DISCLOSURE

A catalyst, especially useful in oxychlorination reactions, which consists essentially of (a) copper chloride, (b) potassium chloride and (c) neodymium chloride in specific proportions carried on (d) a porous silica gel carrier.

The catalyst is used in an oxychlorination reaction by heating a feed stream containing a $C_1$-$C_4$ hydrocarbon gas, oxygen, chlorine and/or hydrogen chloride to a temperature of from about 325 to about 600° C. in the presence of said catalyst to obtain chlorinated hydrocarbons.

BACKGROUND OF THE INVENTION

Field of the invention

The invention covers a novel oxychlorination catalyst and a process for using said catalyst in the oxychlorination of hydrocarbons to obtain saturated or unsaturated chlorinated hydrocarbons.

DESCRIPTION OF THE PRIOR ART

It is known that hydrocarbons or partially chlorinated hydrocarbons can be reacted in an oxychlorination process with chlorine to produce chlorinated hydrocarbons having increased chlorine contents. In a conventional oxychlorination process, a hydrocarbon, chlorine (or HCl) and oxygen are reacted together at elevated temperatures in the presence of a catalyst to chlorinate the hydrocarbon and to convert hydrogen chloride, which is a reaction product of the chlorination, back to usable, free chlorine. The chlorination reaction and the conversion of the hydrogen chloride to free chlorine occur concurrently in the same reactor with the same catalyst, and the free chlorine thus produced is used for additional chlorination. Since the hydrogen chloride by-product is constantly being converted to free chlorine, a more efficient utilization of the chlorine content of the feed stream is obtained. The principal reactions that occur in the oxychlorination of a hydrocarbon, e.g. methane, are illustrated as follows:

$$CH_4 + 4Cl_2 \rightarrow CCl_4 + 4HCl \quad \text{Equation I}$$

$$4HCl + O_2 \rightarrow 2Cl_2 + 2H_2O \quad \text{Equation II}$$

The reaction illustrated in Equation II, whereby HCl is converted to free chlorine in the presence of oxygen, is sometimes called the Deacon reaction.

In carrying out a conventional oxychlorination reaction, the chlorine may be supplied either as chlorine gas, hydrogen chloride or mixtures thereof. Hydrogen chloride in the feed stream is simply converted to free chlorine by the reaction shown in Equation II, and the free chlorine is available for chlorination. For example, in the oxychlorination of ethane with HCl as the sole chlorine source, the overall reaction occurs as follows:

$$C_2H_6 + 4HCl + 2O_2 \rightarrow C_2H_2Cl_4 + 4H_2O \quad \text{Equation III}$$

Where it is desired to produce unsaturated chlorinated hydrocarbons, a further reaction, dehydrochlorination, occurs in which hydrogen chloride is liberated from a saturated, chlorinated hydrocarbon, leaving an unsaturated, chlorinated product. This reaction can be illustrated by the dehydrochlorination of pentachloroethane to perchloroethylene as follows:

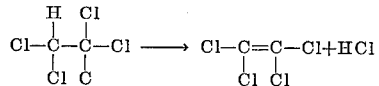

Equation IV

The dehydrochlorination reaction too, occurs in a catalytic reactor concurrently with the chlorination and HCl conversion reactions, described above. The dehydrochlorination reaction, in turn, liberates hydrogen chloride which can be converted in the presence of the catalyst to free chlorine and used for further chlorination within the catalytic reactor.

In order for a catalyst to be useful in promoting the reactions that occur in the oxychlorination process, it must meet certain requirements. Initially, the catalyst must be an effective promoter of all the reactions involved. This is vital not only for reasons of efficiency but also for safety. Catalysts having too low a catalytic activity require excessive amounts of oxygen in the feed mixture and lead to flammable and detonable mixtures.

Further, the catalyst must retain its activity over long periods of use, and must not volatilize or become tacky at reaction temperatures. This latter requirement is particularly important where the catalyst is employed in a fluid bed process where it must remain fluidized and in particulate form.

Fully as important as the other requirements, the catalyst must be selective in its activity and not promote side reactions, particularly the oxidation of the hydrocarbon to form carbon monoxide, carbon dioxide and other such carbon-oxygen containing compounds with consequential, complete loss of the oxidized hydrocarbon.

While some of the prior catalysts, particularly those containing cupric chloride in combination with certain rare earth metals, have satisfied some of the above requirements, they have not satisfied all of these conditions and particularly the requirement for selectivity of the catalyst to reduce oxidation of the hydrocarbon feed.

Accordingly, there is a need in the art for an oxychlorination catalyst of long life which will promote the oxychlorination reactions in a selective manner, and in high yield, without losing its activity under conditions of use.

SUMMARY OF THE INVENTION

We have now found a catalyst that is espeically useful in promoting oxychlorination reactions and which is particularly selective in its catalytic activity consisting essentially of (a) copper chloride, (b) potassium chloride, (c) neodymium chloride and (d) a silica gel carrier having a surface area of at least about 150 m.²/g. and an average pore size of at least about 60 A., said catalyst containing:

(1) At least 1.5 weight percent total of the catalytic metals of (a), (b) and (c), calculated as uncombined metals, the weight percent being based on the total weight of uncombined metals and said carrier, (2) An atomic ratio of potassium to copper of 0.6:1 to 3:1, and (3) An atomic ratio of neodymium to copper of at least 0.4:1.

We have also found that this catalyst is particularly useful in an oxychlorination process in which a feed stream containing a $C_1$-$C_4$ hydrocarbon gas, oxygen, chlorine and/or hydrogen chloride is heated to a temperature of from about 325 to about 600° C. in the presence of said catalyst to obtain a chlorinated hydrocarbon as the product, and preferably trichloroethylene and perchloroethylene.

DESCRIPTION OF THE INVENTION AND THE PREFERRED EMBODIMENTS

The catalysts of this invention are prepared by dissolving the catalytic agents, namely copper chloride, potassium chloride and neodymium chloride, either separately or in combination, and impregnating the carrier with an aqueous solution of the catalytic agents. In practice, the carrier, which is in finely divided form, is simply added to an aqueous solution of catalytic agents. The solution is taken up by the carrier and the carrier is dried. Preferably, the drying involves slow evaporation of water, for example by permitting the catalysts to dry at room temperature for several hours, e.g. 24 hours, followed by complete drying in an oven in which the temperature is gradually raised to about 400° C. over several hours. During the drying stage, the catalytic agents crystallize out within the pores and on the surface of the carrier.

In the above description of the preferred catalyst preparation, the chlorides of the catalytic metals are crystallized on the carrier. However, it should be understood the certain water-soluble salts of these catalytic metals, e.g. the acetates, nitrates, etc. of copper, potassium and neodymium, can also be crystallized from aqueous solutions onto the carrier in the same manner as the corresponding chloride salts. The crystallized salts can then be converted to the corresponding metal chlorides while on the carrier by contacting the catalyst and carrier with chlorine or HCl at the temperatures normally used in oxychlorination reactions.

The total amount of catalysts on the carrier is from about 1.5 to about 35% by weight, calculated as the uncombined metals, the percent by weight being based on the total weight of the uncombined metals and the carrier. Use of less than about 1.5% does not provide for sufficient catalysis of the above described reactions; more than about 35% is wasteful since the catalyst operates on the basis of the catalytic surface area available to the reactants and deposition of more than 35% merely results in building up thicker layers of the catalytic salts with no added catalytic effect. It is clear, however, that amounts greater than 35% will operate.

The potassium and copper used in the present catalyst are employed in amounts sufficient to give an atomic ratio of 0.6:1 to 3:1. Further, the atomic ratio of neodymium to copper is at least 0.4:1. As used herein, the term "atomic ratio" refers to the number of atoms of one catalytic metal which is present, relative to the atoms of another catalytic metal. The preferred manner of dispositing this ratio of catalytic agents onto a carrier is to dissolve the chlorides of these metallic catalysts in a ratio corresponding to the desired atomic ratio in an aqueous solution, and to impregnate the carrier with the solution. The total amount of catalyst which is deposited on the carrier is governed by the concentration of the catalyst salts in solution. The preferred catalyst contains from about 2 to about 3% by weight of each of copper, potassium and neodymium calculated as the uncombined metal, the percent by weight being based on the total weight of the uncombined metals and the carrier.

The porous carrier employed in the present catalyst preferably is silica gel, particularly the microspheroidal type (Grace Chemical Co., Grade 951, Silica gel catalyst), having a surface area of at least about 150 m.$^2$/g. and an average pore size of at least about 60 A.

The particle size of the carrier may vary depending upon the type of reactor in which the catalyst is employed. In general, the catalysts may vary in size from 30 to 400 mesh. However, if the catalyst is used in fluid bed reactors (as defined hereinafter) the particle size of the catalyst can range from 10 to 600 microns; microspheroidal particles having an average particle size of 54–65 microns are preferred in fluid bed reactors.

In addition to catalyzing oxychlorination reactions, the present catalyst will catalyze the Deacon reaction per se as well as any dehydrochlorination reactions occurring concurrently with the oxychlorination reaction. In carrying out an oxychlorination reaction using the present catalyst, a gas stream containing a chlorine source, i.e. hydrogen chloride and/or chlorine, is mixed with an oxygen-containing gas and with a hydrocarbon gas (or partially chlorinated hydrocarbon gas), and heated to a temperature of from about 325 to 600° C. in the presence of the catalyst. The relative proportion of these reactants can be varied depending on the extent of hydrocarbon chlorination desired and on the product desired. For example, in the oxychlorination of methane, ethane, ethylene, propane, butane or derivatives thereof, between 0.6 to 10.0 gram atoms of chlorine (introduced as hydrogen chloride and/or chlorine) can be added per mole of hydrocarbon introduced into the reactor. Similarly, the oxygen may vary from 0.2 to 6.0 moles of oxygen per mole of hydrocarbon introduced. In this reaction the oxygen may be introduced either as oxygen gas per se, as gaseous oxygen diluted with an inert gas such as nitrogen as air, or as air enriched with oxygen.

The hydrocarbons and partially chlorinated hydrocarbon gases which can be reacted in the present oxychlorination process are exemplified by methane, ethane, ethylene, propylene, propane, dichloroethane, tetrachloroethane, vinyl chloride, dichloroethylene and butane. As used herein the term "gases" includes the hydrocarbons and chlorinated hydrocarbons which are not gaseous under ambient conditions but which are vaporized when conducting the oxychlorination reaction.

Products of these reactions typically are fully chlorinated and partially chlorinated hydrocarbons, such as carbon tetrachloride, perchloroethylene, trichloroethylene, dichloroethane, vinyl chloride, dichloroethylenes and methylenechloride, together with side products such as water, carbon dioxide, carbon monoxide and the like. The products are in vapor phase as they leave the reactor. The desired products are separated from the side products and purified by means common in the art. Normally, the chlorinated hydrocarbon products are obtained as mixtures of products that can be separated, for example by fractional distillation, selective adsorption and desorption operations, selective dissolution and the like.

In the preferred manner of operation, the oxychlorination reaction is carried out in a fluidized reactor in which both the Deacon and dehydrochlorination reactions occur concurrently. In this process, a chlorine source (hydrogen chloride and/or chlorine), air and a hydrocarbon gas are charged into the bottom of a vertically disposed reactor containing the finely divided catalyst. The force of the upflowing gases lifts the finely divided, particulate catalyst from the base of the reactor and forms a mass of suspended, turbulent catalyst particles supported only by the upflowing gases; this is termed a fluidized bed. The fluidization of the catalyst suitably is initiated with nitrogen and the various reaction gases are then introduced gradually until they reach the proper proportions and reaction commences; recovery of reaction products at the opposite end of the reactor is then started.

Linear gas velocity through the catalyst bed normally is 0.05 to 2.5 feet per second; higher velocities cause undue carryover of catalyst fines whereas lower velocities do not effect proper fluidization. Where heat must be supplied to the reaction system, common means such as preheating feed gases, electrical heaters and the like may be employed. The reactions generally are exothermic, however, and normally it is necessary to cool the system. To this end, cooling means such as cooling elements carrying cooling fluids may be present in the fluidized bed itself or surrounding the bed.

In fluid bed reactors operating at temperatures of about 400° C. and above, it is preferred to use a catalyst containing from 1.5 to about 20% by weight total of the catalytic metals calculated as the uncombined metals, the percent by weight being based on the total weight of uncombined metals and the carrier. This amount of catalytic metal facilitates fluidization and prevents any agglomeration of catalyst particles in the fluidized bed due to surface melting of the catalyst salts.

Alternatively, the reaction is carried out in a system in which the catalyst is in a fixed bed, and reactants are passed through or over it. The same general considerations apply as apply in the fluidized bed system in that it is necessary to provide heat in some stages and withdraw heat at others, and suitable heat exchange means must be provided.

The catalysts of the present invention are highly effective in promoting the oxychlorination reactions (illustrated by Equation III), as well as the Deacon reaction (illustrated by Equation II), and the dehydrochlorination reaction (illustrated by Equation IV), and yet are extremely selective in their catalytic activity, without promoting hydrocarbon oxidation. These catalysts have resulted in better than 90% utilization of the hydrocarbon and the chlorine fed into oxychlorination reactions. These catalysts retain their activity for prolonged periods when used at temperatures of from 325 to 600° C. When preferred temperatures of 400 to 450° C., which are required for dehydrochlorination, are utilized with these catalysts, unsaturated chlorinated hydrocarbons, e.g. trichloroethylene and perchloroethylene, can be produced in one overall process.

Potassium has been found superior to other alkali metals in the present catalyst. However at temperatures above about 430° C. certain alkali metals, namely sodium and lithium can be substituted for potassium to yield effective catalysts—albeit, somewhat inferior to potassium. Other alkali metals such as rubidium do not yield an acceptable catalyst.

The following examples are presented by way of illustration of the preparation of the catalysts of this invention and their use in typical oxychlorination reactions. They are not to be considered as limiting the scope of this invention in any way.

EXAMPLE 1.—PREPARATION OF CATALYSTS

One hundred thirteen grams of a microspheroidal silica gel carrier having a surface area of 600 m.²/g., an average pore size of 67 A. and an average particle size of 54–65 microns (Grace Chemical Co., Grade 951, Silica gel catalyst) was impregnated with a 200 ml. aqueous solution containing 7.2 g. of cupric chloride, 6.1 g. of potassium chloride and 6.1 g. of (99.9% pure) neodymium chloride. The impregnated carrier was heated at 200° C. for 6 hours and then placed in a muffle furnace for 6 hours at 400° C. until dry. The resultant catalyst contained, by weight, 2.5% copper, 2.5% potassium and about 2.5% neodymium, calculated as the uncombined metal, the percent by weight being based on the total weight of the uncombined metals and said carrier.

EXAMPLE 2.—OXYCHLORINATION OF ETHYLENE

Run A—Process of the invention

A reactor consisting of glass tube (1⅝ inches I.D., 24 inches long) containing a perforated catalyst support was positioned vertically and charged with 200 cc. of the catalyst described in Example 1. Reactant gases were introduced into the lower part of the reactor to form a mixture containing ethylene, chlorine, oxygen and nitrogen in mole ratios of 1.0:2.0:1.7:6.4, respectively. The feed mixture was passed through the reactor at a rate equivalent to an average linear flow of 0.28 feet per second. This was sufficient to maintain the catalyst bed in a fluidized condition. The reaction temperature in the reactor was 425° C. and it was maintained at this level by means of a tubular, electrical furnace controlled by a powerstat. The reaction products emerging from the upper part of the reactor were collected, weighed and analyzed. Approximately 90% of the chlorine (introduced as elemental chlorine) and 91% of the carbon was utilized in producing chlorinated hydrocarbons with 73% of the chlorine introduced being converted to trichloroethylene and perchloroethylene. Conversion of carbon to carbon oxides was 9%.

Run B—Catalyst not containing neodymium

The process of Run A was repeated except that the catalyst contained no neodymium chloride. The conversion of the chlorine values to chlorinated hydrocarbons was 75% with 37% of the chlorine values being converted to trichloroethylene and perchloroethylene. Conversion of carbon to carbon oxides was 28%.

EXAMPLE 3

Run A—Process of the invention

The process of Example 2, Run A was repeated using the same reactants and flow rates as in Example 2, except that the temperature was increased to 450–460° C. The conversion of chlorine to chlorinated hydrocarbons was 87% and conversion of carbon to chlorinated hydrocarbons was 88%, with 81% of the total chlorine introduced into the reactor being converted to trichloroethylene and perchloroethylene.

Run B—Catalyst containing didymium chloride in place of nedoymium chloride

The process of Run A was repeated except that the catalyst contained didymium chloride in place of neodymium chloride. The conversion of the chlorine values to chlorinated hydrocarbons was 82% with 76% of the chlorine values being converted to trichloroethylene and perchloroethylene. Conversion of carbon to carbon oxides was 20%.

EXAMPLE 4

The same recator and conditions set forth in Example 3, Run A, were repeated, except that the reactants were a mixture of ethylene, hydrogen chloride, oxygen and nitrogen in the mole ratios of 1.0:3.5:3:11, respectively. The conversion of chlorine to chlorinated hydrocarbons was 87% with 69% of the total chlorine added being converted to tri- and perchloroethylene. Conversion of carbon to carbon oxides was 7%.

EXAMPLE 5

The procedure of Example 2, Run A, was repeated with catalysts containing, by weight, 2.5% copper, 2.5% potassium and 2.5% of the rare earth metal indicated in Table 1, calculated as the uncombined metal, the percent by weight being based on the total weight of the uncombined metals and said carrier. The catalysts were supported on the same silica gel catalyst support used in Example 1, Run A. The conversion of chlorine to chlorinated hydrocarbons and the conversion of carbon to carbon oxides are also set forth in Table 1. Run A covers the catalyst of the present invention, while runs 1–5 cover catalysts made with rare earth metals other than neodymium.

TABLE 1

| Run No. | Rare earth metal | Percent chlorine conversion | Percent oxidized to carbon oxides |
|---|---|---|---|
| A | Neodymium (present invention) | 90 | 9 |
| 1 | Lanthanum | 79 | 20 |
| 2 | Samarium | 79 | 18 |
| 3 | Praseodymium | 80 | 17 |
| 4 | Didymium | 82 | 12 |
| 5 | Gadolinium | 81 | 19 |

The results of Table 1 clearly show the superior selectivity of the neodymium-containing catalyst of the present invention. The results demonstrate that in comparative runs, the neodymium-containing catalyst yields higher chlorine conversion and lower carbon oxidation than comparative catalysts containing the above rare earth metals other than nedoymium.

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process of carrying out an oxychlorination reaction which comprises heating a feed mixture containing a member selected from the group consisting of ethane and chlorinated ethanes having up to 4 chlorine atoms and ethylene and chlorinated ethylenes having up to 2 chlorine atoms, oxygen, and a member selected from the group consisting of chlorine and hydrogen chloride to a temperature from about 325 to about 600° C. in the presence of a catalyst consisting essentially of (a) copper chloride, (b) potassium chloride, (c) neodymium chloride and (d) a silica gel carrier having a surface area of at least about 150 m.$^2$/g. and an average pore size of at least about 60 A., said catalyst containing:

(1) at least 1.5 weight percent total of the catalytic metals of (a), (b) and (c) calculated as uncombined metals, the weight percent being based on the total weight of uncombined metals and said carrier, (2) an atomic ratio of potassium to copper of 0.6:1 to 3:1, and (3) an atomic ratio of neodymium to copper of at least 0.4:1, and recovering a chlorine-enriched, chlorinated hydrocarbon as the product.

2. Process of claim 1 wherein the product is selected from the group consisting of trichloroethylene and perchloroethylene.

3. Process of claim 1 wherein said mixture is heated to about 400–450° C. in the presence of said catalyst.

4. Process of claim 1 wherein said oxychlorination reaction is carried out in a fluidized bed and the catalyst contains from 1.5 to about 20 weight percent total of the catalytic materials of (a), (b) and (c) calculated as uncombined metals, the weight percent being based on the total weight of uncombined metals and said carrier.

References Cited

UNITED STATES PATENTS

| | | | |
|---|---|---|---|
| 2,327,174 | 8/1943 | Cass | 260—654 |
| 3,210,431 | 10/1965 | Engel | 252—441 |
| 3,260,678 | 7/1966 | Engel et al. | 252—441 |
| 3,267,162 | 8/1966 | Bohl | 260—654 |

LEON ZITVER, Primary Examiner

J. A. BOSKA, Assistant Examiner

U.S. Cl. X.R.

252—441